United States Patent [19]

Pearlstein et al.

[11] Patent Number: 5,409,747
[45] Date of Patent: Apr. 25, 1995

[54] DISPOSABLE CONTAINER FOR MOIST PAPER TOWELS AND A METHOD OF MAKING THE SAME

[75] Inventors: Leonard Pearlstein, 1441 Waverly Ave., Gladwyne, Pa. 19035; Stuart P. Suskind, Wayne, Pa.

[73] Assignee: Leonard Pearlstein, Gladwyne, Pa.

[21] Appl. No.: 154,441

[22] Filed: Nov. 19, 1993

Related U.S. Application Data

[60] Division of Ser. No. 923,556, Aug. 3, 1992, Pat. No. 5,286,538, which is a continuation-in-part of Ser. No. 740,141, Aug. 5, 1991, abandoned.

[51] Int. Cl.$^6$ ............................................. B65D 71/00
[52] U.S. Cl. .................................. 428/34.2; 428/34.6; 428/35.7; 428/514; 428/513; 428/481; 206/812
[58] Field of Search ............ 428/34.2, 34.6, 34.7, 428/35.7, 537.5, 507, 509, 511, 512, 513, 514, 481; 424/443, 445; 206/812

[56] References Cited

U.S. PATENT DOCUMENTS

| | | | |
|---|---|---|---|
| Re. 33,376 | 10/1990 | Gibbons et al. | 428/34.2 |
| D. 269,329 | 6/1983 | Malamoud | D10/18 |
| 967,688 | 8/1910 | Titherley | 424/443 |
| 1,466,888 | 9/1923 | Morrissey | 15/208 |
| 1,786,513 | 12/1930 | Zuckerman | 252/91 |
| 2,109,749 | 3/1938 | McColl | 15/104.93 |
| 2,187,163 | 1/1940 | Langer | 15/104.93 |
| 2,367,520 | 1/1945 | Patek | 229/3.1 |
| 2,840,080 | 6/1958 | Clark | 604/289 |
| 2,999,265 | 9/1961 | Duane et al. | 424/443 |
| 3,057,467 | 10/1962 | Williams | 206/361 |
| 3,129,867 | 4/1964 | Schroeder | 220/462 |
| 3,150,049 | 9/1964 | Emory | 424/447 |
| 3,206,907 | 9/1965 | Schroeder | 53/449 |
| 3,234,858 | 2/1966 | Rein et al. | 493/60 |
| 3,240,326 | 3/1966 | Miller | 206/361 |
| 3,263,891 | 8/1966 | Brugh, Jr. | 229/3.1 |
| 3,264,188 | 8/1966 | Gresham | 428/485 |
| 3,305,383 | 2/1967 | Gordy | 427/416 |
| 3,414,927 | 12/1968 | Worcester | 15/104.93 |
| 3,485,349 | 12/1969 | Chaney | 206/812 |
| 3,495,507 | 2/1970 | Haas et al. | 493/287 |
| 3,499,575 | 3/1970 | Rockefeller | 206/812 |
| 3,533,533 | 10/1970 | Chaney, Jr. | 221/25 |
| 3,561,994 | 2/1971 | Dwyre | 427/212 |
| 3,604,613 | 9/1971 | Haas et al. | 229/190 |
| 3,624,224 | 11/1971 | Watchung et al. | 424/443 |

(List continued on next page.)

FOREIGN PATENT DOCUMENTS

| | | |
|---|---|---|
| 0194097 | 9/1986 | European Pat. Off. . |
| 0197485 | 10/1986 | European Pat. Off. . |
| 0240009 | 10/1987 | European Pat. Off. . |
| 0370192 | 5/1990 | European Pat. Off. . |
| 0397510 | 11/1990 | European Pat. Off. . |
| 0459110 | 12/1991 | European Pat. Off. . |
| 0534471 | 3/1993 | European Pat. Off. . |
| 2302925 | 10/1976 | France . |
| 460625 | 7/1968 | Switzerland . |
| 928610 | 6/1963 | United Kingdom . |
| 1454599 | 11/1976 | United Kingdom . |
| WO93/02947 | 2/1993 | WIPO . |

OTHER PUBLICATIONS

E. W. Veazey, "The Potential Of LLDPE In Coextruded Film," First Annual Paper, Film and Foil Converter, Feb. 1982, pp. 41–46.

Abstract (J04298345) for "Paper Container Which Degrades In Environment," Oct. 22, 1992.

Abstract (J04062054) for "Decomposable Laminated Sheet Preparation For Packaging Foods, Etc." Feb. 27, 1992.

International Search Report, dated 10 Jan. 1994, mailed 18 Jan. 1994.

*Primary Examiner*—Ellis P. Robinson
*Assistant Examiner*—Michael A. Williamson
*Attorney, Agent, or Firm*—Finnegan, Henderson, Farabow, Garrett & Dunner

[57] ABSTRACT

A biodegradable paperboard container having an inner moisture resistant barrier coating for storing moist towels and a method for producing the container and moist towels.

21 Claims, No Drawings

U.S. PATENT DOCUMENTS

| | | | |
|---|---|---|---|
| 3,657,760 | 4/1972 | Kudisch | 15/104.93 |
| 3,659,772 | 5/1972 | Dorsey et al. | 229/3.1 |
| 3,754,642 | 8/1973 | Stidolph | 206/45.14 |
| 3,784,055 | 1/1974 | Anderson | 221/46 |
| 3,784,056 | 1/1974 | Spruyt et al. | 221/60 |
| 3,794,698 | 2/1974 | Diaz et al. | 524/585 |
| 3,841,466 | 10/1974 | Hoffman et al. | 206/205 |
| 3,881,210 | 5/1975 | Drach et al. | 15/104.93 |
| 3,904,074 | 9/1975 | Hoffman et al. | 220/339 |
| 3,953,169 | 4/1976 | Igarashi et al. | 8/192 |
| 3,958,056 | 5/1976 | Brught, Jr. et al. | 428/215 |
| 3,965,518 | 6/1976 | Muoio | 15/104.93 |
| 3,965,519 | 6/1976 | Hermann | 15/104.93 |
| 3,972,467 | 8/1976 | Whillock et al. | 220/450 |
| 4,000,816 | 1/1977 | Spruyt | 220/339 |
| 4,026,458 | 5/1977 | Morris et al. | 229/3.1 |
| 4,112,167 | 9/1978 | Dake et al. | 428/154 |
| 4,131,195 | 12/1978 | Worrell, Sr. | 206/205 |
| 4,147,836 | 4/1979 | Middleton et al. | 428/481 |
| 4,220,244 | 9/1980 | Elmore | 206/210 |
| 4,237,190 | 12/1980 | McGee | 428/513 |
| 4,245,744 | 1/1981 | Daniels et al. | 206/210 |
| 4,309,469 | 1/1982 | Varona | 428/74 |
| 4,332,319 | 6/1982 | Hurwood | 206/210 |
| 4,339,507 | 7/1982 | Kurtz et al. | 428/522 |
| 4,362,781 | 12/1982 | Anderson | 428/291 |
| 4,381,246 | 4/1983 | Anderson | 252/91 |
| 4,427,111 | 1/1984 | Laipply | 206/210 |
| 4,435,344 | 3/1984 | Iioka | 264/45.1 |
| 4,437,567 | 3/1984 | Jeng | 206/210 |
| 4,448,704 | 5/1984 | Barby et al. | 252/91 |
| 4,452,846 | 6/1984 | Akao | 428/220 |
| 4,513,036 | 4/1985 | Thompson et al. | 206/524.6 |
| 4,525,396 | 6/1985 | Takasa et al. | 428/34.2 |
| 4,537,807 | 8/1985 | Chan et al. | 428/74 |
| 4,559,157 | 12/1985 | Smith et al. | 252/90 |
| 4,576,865 | 3/1986 | Akao | 428/335 |
| 4,590,126 | 5/1986 | Andersson | 428/346 |
| 4,660,737 | 4/1987 | Green et al. | 220/410 |
| 4,666,621 | 5/1987 | Clark et al. | 428/227 |
| 4,678,698 | 7/1987 | Mencke | 206/812 |
| 4,696,393 | 9/1987 | Laipply | 206/210 |
| 4,698,246 | 10/1987 | Gibbons et al. | 428/34.2 |
| 4,701,360 | 10/1987 | Gibbons et al. | 428/34.2 |
| 4,732,797 | 3/1988 | Johnson et al. | 428/74 |
| 4,739,879 | 4/1988 | Nakamura | 206/205 |
| 4,741,944 | 5/1988 | Jackson et al. | 428/152 |
| 4,772,501 | 9/1988 | Johnson et al. | 428/288 |
| 4,778,699 | 10/1988 | Knox, III et al. | 428/35.2 |
| 4,789,575 | 12/1988 | Gibbons et al. | 428/34.2 |
| 4,795,665 | 1/1989 | Lancaster et al. | 428/34.2 |
| 4,796,751 | 1/1989 | Madkour | 206/223 |
| 4,806,398 | 2/1989 | Martin, Jr. | 428/34.2 |
| 4,806,399 | 2/1989 | Gibbons et al. | 428/34.2 |
| 4,817,790 | 4/1989 | Porat et al. | 206/205 |
| 4,828,912 | 5/1989 | Hossain et al. | 530/361 |
| 4,880,696 | 11/1989 | Yanidis | 428/349 |
| 4,882,221 | 11/1989 | Bogart et al. | 428/308.8 |
| 4,948,640 | 8/1990 | Gibbons et al. | 428/34.9 |
| 4,950,510 | 8/1990 | Massouda | 428/34.2 |
| 4,988,546 | 1/1991 | Tanner et al. | 428/34.2 |
| 4,998,984 | 3/1991 | McClendon | 206/205 |
| 5,049,440 | 9/1991 | Bornhoeft, III et al. | 428/288 |
| 5,059,459 | 10/1991 | Huffman | 428/34.2 |
| 5,064,699 | 11/1991 | Havens et al. | 428/35.7 |

5,409,747

DISPOSABLE CONTAINER FOR MOIST PAPER TOWELS AND A METHOD OF MAKING THE SAME

CROSS REFERENCE TO RELATED APPLICATION

This is a division of application Ser. No. 07/923,556, filed Aug. 3, 1992, now U.S. Pat. No. 5,286,538, which was a continuation-in-part of application Ser. No. 07/740,141, filed Aug. 5, 1991, now abandoned.

BACKGROUND OF THE INVENTION

The present invention relates to the use of biodegradable, crush-resistant paperboard containers to store moist towels or napkins. More particularly, the present invention relates to towels or wipes having a lotion with a surface tension selected to prevent leaking and breakthrough wetting when the towels or wipes are contained in biodegradable containers.

It is well known to package dry towels, napkins and tissues of a multitude of shapes and sizes in simple cardboard containers.

Moist paper towels and napkins of a variety of shapes and sizes, with a variety of intended uses are currently available on the market. These towels are packaged in solid plastic containers to prevent seepage of the moisture in the towels through the containers and provide dimensional stability. Moisture seepage and a loss of strength are associated with the storage of moist towels in standard paperboard containers. The plastic containers which are currently available on the market suffer from the significant drawbacks that they are not biodegradable and use relatively large amounts of petrochemical based plastics. The plastic containers of the prior art suffer from the added disadvantage that they take up considerable room in existing waste disposal facilities.

For example, the combined weight of a plastic tub and lid is typically about 90 grams; whereas, the container of the present invention is typically only about 72 grams of which about 11 grams are plastic and the remaining 61 are pulp. Pulp is readily biodegradable under composting conditions and is considered a renewable resource. Composting is the process in which waste is degraded to humus or biomass under accelerated and controlled conditions of moisture, air and microorganisms. More specifically, paper, under composting conditions, is converted into carbon dioxide, water, and biomass. The biomass is essentially comprised of microorganisms. Thus, the mass of waste is significantly reduced and the humus by-product has commercial value as low grade fertilizer, soil conditioner, and as a mulch for land and agricultural applications.

Heavy thick plastic tubs are neither biodegradable under composting conditions nor are they taken from a renewable source. In addition to not being biodegradable, these plastic tubs are not incineratable.

Biodegradable paperboard containers are currently in use on the market for storage of such things as dry food products and photographic films. Many of these biodegradable containers use a low density polyethylene barrier coating to shield the contents from moisture, light, oxygen and spoilage.

Folded paperboard containers for containing liquids must meet the following general specifications:

a. barrier properties sufficient to reduce or prevent absorption and/or transmission of liquid components;
b. heat sealability for carton construction and integrity;
c. printability to provide attractive, nonfunctional graphics;
d. vapor barrier to contain fragrances, flavors, moisture, etc.;
e. barrier to $O_2$ and other ambient gases; and
f. rigidity, shape retention, and crush resistance.

SUMMARY OF THE INVENTION

Given the current waste disposal problems, an object of the present invention is to provide a disposable and substantially compostable, crush-resistant container having a thin moisture resistant inner coating and a thin outer barrier coating which will allow storage of moist paper towels or napkins without the leakage problems and strength loss suffered by the prior art.

It is a further object of the present invention to provide a container having therein moist towels or napkins having a surface tension which is selected to prevent seepage of moisture through biodegradable paperboard storage containers.

It is a further object of the present invention to provide a biodegradable container for moist towels comprising a coated paperboard container having a thin moisture resistant inner coating and having therein moist towels having a lotion with a surface tension greater than about 27 dynes/cm, after expression, to prevent leakage through the package.

A further object of the invention is to provide a process of producing a biodegradable container having moist towels therein which is free from leaks comprising, formulating the moist towels so that the lotion surface tension is greater than about 27 dynes/cm, after expression from the wipe or towel, providing a paperboard container which has a thin moisture resistant inner coating and an outer barrier coating, wherein the paperboard has a Taber stiffness of at least 110 and placing the towels into the container and sealing the container.

It is still another object of the present invention to provide a biodegradable container meeting the general specifications set forth above for folded paperboard containers.

To achieve the objects and in accordance with the purpose of the invention, as embodied and broadly described herein, the invention comprises a biodegradable crush-resistant and shape retentive container. According to the invention, the container is a paperboard container having therein moist towels wherein the coated paperboard has a Taber stiffness of at least 110 and has a thin moisture resistant inner coating. In accordance with the present invention, there is provided a biodegradable, crush-resistant container for moist towels having a paperboard container wherein said coated paperboard has a Taber stiffness of at least 110 and has a thin moisture resistant inner coating and having therein moist towels having a lotion with a surface tension greater than about 27 dynes/cm, after expression.

In another aspect of the present invention, there is provided a process of producing a biodegradable, crush-resistant container having moist towels therein which is substantially free from leaks, by formulating moist towels so that the lotion in the towels has a surface tension that is greater than 27 dynes/cm, providing a paperboard container having a Taber stiffness of at least 110 and which has a thin moisture resistant inner coating, and placing the towels into the container and sealing the container.

In still another aspect of the present invention, there is provided a flushable moist towel for use in a biodegradable container wherein a moist towel contains a lotion having all natural ingredients and having at most about 99.3% water; at least 0.2% benzoic acid; at least 0.2% tartaric acid; at least 0.2% glycerine; and at least 0.1% citric acid.

Other objects and advantages will become apparent from the practice of the invention as set out in the following description.

DETAILED DESCRIPTION OF THE INVENTION

According to the present invention a standard paperboard container having a thin moisture resistant inner coating for sealing purposes is used to store the moist towels or napkins. The paperboard for use in the present invention has a basis weight of at least 150 lbs/ream preferably about 175 lbs/ream and more preferably about 215 lbs/ream. According to one embodiment of the present invention, the paperboard has a thickness from about 15 to 30 mils and more preferably about 18 to 25 mils. The coated paperboard should be selected to produce a container having a cross directional (CD) stiffness as determined by the Taber method of at least 110 and more preferably at least 135. The Taber method is described in TAPPI Test Procedure T-489.

The ratio of cross direction Taber stiffness of the coated paperboard to the basis weight (lb/ream) of the paperboard is at least 0.5 and more preferably at least 0.63.

Paperboard is generally stronger and stiffer in the machine direction (MD) than in the cross direction. According to one embodiment of the present invention the machine direction preferably runs along the container from side to side, i.e. in a direction perpendicular with the top and bottom of the container. The machine direction runs from side to side of the container; the fiber direction of the paperboard from top to bottom of the container is said to be the cross direction (CD). The coated paperboard used in the container according to the present invention preferably has a ratio of Taber stiffness of MD/CD of less than or equal to about 2.65, more preferably less than or equal to about 1.92.

The moisture resistant inner coating is a material capable of preventing moisture from the contents in the container from permeating the paperboard container. The coating material is preferably selected from polyolefin resins, more preferably low density polyethylene, and most preferably linear low density polyethylene to provide barriers against moisture, light and oxygen. The moisture resistant inner coating is a thin layer having a thickness from about 0.5 to about 6.0 mils, preferably having a thickness from about 1.0 to about 2.5 mils and more preferably having a thickness from about 1.5 to about 2.0 mils. Other coatings which may be used in certain embodiments of the present invention are e.g., silicone resins, polytetrafluoroethylene, polyethylene vinyl acetate, polyacrylates, Saran (polyvinylidene chloride), polyvinyl chloride and the like.

The moisture resistant inner coating can be applied to the paperboard using any conventional method which provides a nonpeelable coating of the material on the paperboard. Preferably it is applied using extrusion coating.

Linear low density polyethylene (LLDPE) offers improved performance in strength, toughness and resistance to chemicals making it the preferred barrier coating. When forming a paperboard container or box, the stress within the container is very high due to the "memory" of the paperboard and accordingly, it has a tendency to unfold. Such recovery forces are focused on both the cohesive properties of the polymer itself at the seals and on the adhesive strength of the polymer to paperboard at the sealed edges or folds on the bottom. The coating should be tough, i.e., high in strength and elongation, in order to yield rather than break and expose fibers of the paperboard which can wick fluids through by capillary action.

For example, a typical film of LLDPE based on DOWEX RESIN 2045, (Dow Chemical) has a Dart Impact value of 237. A typical film based on LDPE (Dow 122) has a Dart Impact value of 170. Ultimate tensile strength of the former film is 1.4 times higher in the machine direction and 1.6 times higher in the cross machine direction when compared to the latter film, thus making it the preferred choice.

Elongation to break values are also higher (i.e., 630 to 810% vs. 215 to 645%) making LLDPE tougher, more rubbery, more flexible and less likely to crack or break. See Veazey, E. W., "The Potential of LLDPE in Coextruded Film", *Paper, Film and Foil Converter,* Pp. 41–46, February 1983.

The outer barrier coating provides resistance to contamination, abrasion resistance and water repellency. The outer barrier coating is preferably selected from known plastic materials, more preferably selected from polyethylene, low density polyethylene, linear low density polyethylene, Saran, PVC, or polyester. For the reasons as described above, linear low density polyethylene is also the preferred outer barrier coating. The barrier coating is applied in a thickness from about 0.5 to about 3.0 mils, preferably from about 0.5 to about 1.5 mils, and more preferably from about 0.5 to about 1.0 mil.

The outer barrier coating can be applied using any conventional method. Preferably, it is applied by impregnation or melt extrusion coating. Melt extrusion coating is the extrusion of molten polymer onto the paperboard. Impregnation is the superior method for applying the outer barrier coating but it is more expensive thereby making melt extrusion coating the preferred method of applying the outer barrier coating.

Coating techniques, for example, extrusion coating, impregnation and the like, are well known in the art, and in accordance with the present invention, inner coatings and outer barrier coatings may be applied by processes well known in the art. Furthermore, the design, quality control and fabrication of folded cartons for the containment of liquids are well known in the art, and these processes and techniques may be used in making the containers of the present invention.

The container which is preferable for use with the present invention has cut ends which are sealed to avoid seepage of the liquid into or out of the body of the paperboard. The sealing of the edges may be done in a variety of manners. It may be accomplished by coating the edges, or by thinning the material down near the cut edges, i.e., skivving. Skivving of the edges is followed by folding the skivved areas over the cut edges.

In a preferred embodiment, there is a moisture-impervious membrane provided over the contents. Such membranes are sometimes referred to as lidding stock or material. Membranes for this application are typically comprised of a strong barrier top layer with a heat sealable lower layer. Non-limiting examples of top layers which may be used in the present invention, include polyester and metallized polyester, high density polyethylene, and paper. Non-limiting examples of heat seal layers include low density polyethylene and copolymers or mixtures with vinyl acetate. The edges of the membrane are adhered to the upper edges of the container and provide an effective storage and shipping seal. The membrane should peel away from the edges of the container at the seal without exposure of pulp fibers. Additionally a moisture-impervious membrane can be heat sealed at the bottom of the container as well. The bottom of the container is preferably heat sealed by applying heat and pressure, as well known in the art.

In one embodiment, when the consumer obtains the product, the consumer rips open a perforation providing a slot or opening in the paperboard, and permitting the hinged cap-like lid to be raised. This exposes the membrane, which is easily peeled off with the fingers and either stored in the box or thrown away. Thereafter, sealing is done entirely by the raising and lowering of the hinged lid. The moist towels or napkins are preferably stacked and lie horizontally in the container and may be individually removed as needed.

An advantage of the structure according to the invention is that almost all of the container is paperboard which is a naturally degradable material. This makes the packaging much more ecologically and environmentally sound and desirable. In addition, unlike commonly used plastic tubs, the containers according to the present invention may be incinerated.

It is also possible to provide a separate or separable pouch, bag or liner within the container to provide further waterproofing protection. Alternatively, this separable liner may be supplied during refilling of the container using a prepackaged bag of replacement wipes.

The container according to the present invention provides sufficient stiffness to provide the consumer with a container having improved handleability and to provide crush resistance of the box during storage, shipment and under conditions of household use. Unlike plastic containers currently in use, the containers in accordance with the present invention can be collapsed after use with the important advantage of reduced space in waste management treatment such as landfills and commercial composting. Containers according to the present invention preferably have a compression strength of at least 60 lbs. and more preferably at least 70 lbs as tested in accordance with TAPPI Test Procedure T-804. The container should also preferably have a cross directional Ring Crush of at least 115 lbs. and more preferably at least 140 lbs. Ring crush can be defined according to TAPPI Test Procedure T818 om-87. The compression strength of the containers is indicative of stacking and handling ability of the containers. Higher stiffness and crush resistance in the cross direction of the paperboard provides improved stacking and handling of the containers.

Wet wipe containers typically contain over 80 wipes which are consumed during a period of at least one week. In light of the repeated handling and dispensing, it was surprising to find during testing, that the paperboard containers meeting the specification described herein provided satisfactory crush resistance and dimensional stability when compared to the current 100% plastic tubs. In accordance with the present invention, it is now practical from both a cost and performance viewpoint, to design and construct crush resistant and shape retentive containers from paperboard of basis weight at least 150 lbs/ream, preferably 175 lbs/ream and more preferably 215 lbs/ream coated on at least the inner side and preferably both sides with at least 0.5 mil. of a coating material, for example, of polyethylene, in which said coated paperboard has a Taber Stiffness in the cross-machine direction of at least 100 and preferably at least 135.

The lotion for use in the towels or wipes preferably includes alkyl and aryl organic acids, polyhydric alcohol, lanolin derivatives, preservatives, a pH adjuster such as citric acid or a phosphate and fragrance. Non-limiting examples of alkyl organic acids include citric acid and tartaric acid and a non-limiting example of an aryl organic acid is benzoic acid. More preferably, the lotion also contains a skin softening agent and/or a cleansing agent. The polyhydric alcohol is preferably propylene glycol or glycerine. The lanolin derivative is preferably PEG 75 lanolin The preservatives preferably include methyl paraben, propyl paraben, diazolidinyl urea and citric, benzoic and tartaric acids. The pH adjuster is preferably citric acid. The skin softening agent is preferably aloe vera. The cleansing agent is preferably cocoamphodiacetate. Other agents well known in the art can be added to the lotion composition or used as substitutes for those set forth above.

The lotion in the towels or wipes to be stored in the container should have a surface tension of greater than about 27 dynes/cm and preferably greater than about 29 dynes/cm after being expressed from the towels in the presence or absence of rewetting agents in the fabric. When a towel or wipe has a lotion with a surface tension greater than the standard surface tension (29 to 32 dynes/cm) of those available on the market today, it may be stored in a coated paperboard container which has the advantages of disposability and biodegradability. Surface tension herein was measured by the DuNouy method according to ASTM D-1331.

The surface tension of the wipes which are currently available on the market, may be raised to a level suitable for use in the present invention by reducing the polypropylene glycol (PPG), reducing the moisturizer for example, cocoamphodioacetate, and/or reducing the fragrance emulsifier for example, nonoxyl-9.

In one embodiment, the products according to the present invention provide the use of natural formula lotions in a biodegradable container.

Natural formula NF-1 with fragrance has a surface tension of about 34.6 dynes/cm and without fragrance NF-1 UNSC has a surface tension of 62.3 dynes/cm prior to fabric saturation. Surface tension values expressed from saturated towels were 28.6 dynes/cm and 29.9 dynes/cm respectively.

One all natural composition preferably includes
  at most about 99.3% water,
  at least 0.2% benzoic acid,
  at least 0.2% tartaric acid,
  optionally, at least 0.2% aloe vera,
  at least 0.2% glycerine,
  at least 0.1% citric acid.

The use of natural lotion formulation is preferred with wipes which may be flushable.

In a second embodiment, the wipes may contain a lotion formulation which is not completely natural. One preferred composition includes deionized water, propylene glycol, aloe vera, diazolidinyl urea, methylparaben, propylparaben, tetrasodium EDTA and citric acid. More particularly, the composition includes:

- at most about 98.55% by weight of deionized water;
- at least 1.00% by weight of Germaben II which includes about 56% propylene glycol, about 30% diazolidinyl urea, about 11% methylparaben and about 3% propylparaben;
- optionally at least 1.00% by weight aloe vera gel;
- at least 0.30% by weight of Versene 220 (tetrasodium EDTA); and
- at least 0.15% by weight of citric acid.

In the selection of lotion and coatings to ensure the longest possible useful shelf life and durability during use, it is desirable to prevent or reduce the wetting of the fibers that may occur through pinholes, tears, or breaks in the coating or through the exposure of fibrous cut edges in the paperboard. These phenomenon can be related to capillary rise.

$$\Delta P = 2\gamma_{LV} \cos \Theta / r$$

wherein P is the pressure difference across the capillary (pore or void with radius r within the paper). A large positive P is indicated when wetting is desirable. A large negative P is indicated when repelling is the objective. In accordance with the present invention, repelling is desired, i.e., a large negative P. To achieve the latter, the contact angle should be as large as possible.

Since, $$\cos \Theta = (\gamma_{SV} - \gamma_{SL})/\gamma_{LV}$$

wherein
- $\gamma_{SV}$ is surface tension solid-vapor,
- $\gamma_{SL}$ is surface tension solid-liquid, and
- $\gamma_{LV}$ is surface tension liquid-vapor, it follows that
$\Delta P = 2(\gamma_{SV} - \gamma_{SL})r$.

A large negative P may be achieved by lowering $\gamma_{SV}$ and by increasing $\gamma_{SL}$. Lower $\gamma_{SV}$ can be obtained by coating the paperboard with polymers such as, e.g., polyolefin, fluorocarbon resins, and silicone resins. Polyolefins are preferred based on low cost.

Increased $\gamma_{SL}$ is achieved by minimizing the amount of surface active material added to the water in the lotion. Fabrics which are manufactured without wetting agents are also desirable as these agents are extracted into the lotion resulting in lower surface tension.

The product according to the present invention and its preparation will be more completely described by means of the following examples. These examples are not to be considered as limiting.

EXAMPLE 1

Comparative

The lotion with fragrance used in this example had a surface tension of 33.5 dynes/cm prior to web saturation. When the lotion was expressed from the treated towel it was lowered to 30.8 dynes/cm due to the presence of rewetting agents in the base fabric or web.

Original folded carton packages in which both sides of the paper were coated with 0.5–2 mils of low density polyethylene were filled with the above described baby wipes.

The results were deemed unacceptable as the wipes caused wetting and severe weakening of the coated paper.

Leakage and wetting of the paperboard can occur through large breaks or cracks in the coating due to poor control of the extrusion process or to surface irregularities in the paperboard. Peeling of the inner coating from the paperboard substrate can expose sections of paperboard as large as 0.25–0.50 inch in diameter leading to rapid failure of the container. In the case of Example 1, the peeling of the inner coating from the paperboard was responsible for the unacceptable results.

EXAMPLE 2

Inventive

A Baby Washcloth lotion was formulated to achieve a higher surface tension. The new formula as set forth in the second embodiment above, gave a surface tension of 41.9 dynes/cm prior to fabric saturation. The new formula was unscented. Fragrances are oily materials and are typically mixed with water through the addition of strong surfactants.

Original folded carton packages in which the insides of the paper were coated with 0.5–1.0 mil of linear low density polyethylene and the outsides were coated with standard low density polyethylene were filled with the above described baby wipes.

Packaged wet wipes from this second group exhibited no strike through wetting of the carton after months of ambient storage. During actual use the wipes were easily dispensed, the carton provided excellent resistance to outside contamination, and the last wipes used exhibited excellent retention of lotion. The packaged wipes lost only about 10–15% by weight after ambient storage for several months.

EXAMPLE 3

Paperboard at 215 lbs/ream basis weight 19 mils thick was extrusion coated with LDPE at a level of 25 lbs/ream (1.0–2.0 mils) and 12 lbs/ream (0.5–1.0 mil) on alternate sides. Total basis weight was measured at 261 lbs/ream.

Rolls of this material were printed with the appropriate baby wipe graphics and then scored and cut into individual carton blanks with the heavier coating on the inside of the carton.

The edge of the inside seal was skivved removing approximately 50% of the board thickness at the width of 7.0 mm. The skivved edge was folded over so that the inner sealed edge would not expose uncoated paperboard. The bottom of the carton was then formed through the action of automated folders followed by thermal sealing to make a water tight box.

Stacks of lotion saturated baby wipes (84 count) were then loaded into a carton. A film was thermally sealed to the top edges, and the box lid was sealed shut with hot melt adhesive. The baby wipe fabric was James River Airtex 1.6 oz/yd$^2$. The dry weight of 84 towels 7.0×8.5 inches was typically around 180 g. After saturation with lotion, the stocks weighed an average of 767 g. The lotion pickup was 320%.

The composition of the lotion was the same as the natural lotion formulation NF-1 described above with the addition of a fragrance comprised of 75% by weight perfume and 25% by weight surfactant Tween 20. (3.3 lbs fragrance was added to 5000 lbs of solution). The surface tension of lotion expressed from the towels was 29.9 dynes/cm.

Strips of the coated paperboard of Example 3 had the following stiffness values:
Taber Stiffness, MD×CD 261×136
Ring Crush, lb MD×CD 148×140
Compression Strength of the container was 62 lbs. The rate of Water Vapor Transmission was 0.0461 gm/100 in$^2$/24 hour as measured by ASTM F1249-90. The inner coated side of the container had a surface tension of 52 dynes/cm and the outer coated side had a surface tension of 54 dynes/cm as measured by ASTM D2578.

EXAMPLE 4

The steps described in Example 3 were repeated with the following exceptions. The paperboard was 205 lbs/ream basis weight (also 19 mils thick). The plastic film was sealed both above and below the wipe contents of the box. The lotion was unscented and had a surface tension of 29.0 dynes/cm when extracted form the saturated towels.

The weight loss upon standing at room temperature (72°–75° F.) was 10 gms/month.

Strips of the coated paperboard of Example 4 had the following stiffness:
Taber Stiffness, MD×CD 306×114
Ring Crush, lb MD×CD 157×135
Compression Strength of the container was 65 lbs.

Consumer home use testing of the wet wipes in paperboard containers from Examples 3 & 4 showed both packages to be acceptable in performance. With respect to overall box durability including crush resistance and dimensional stability, the package of Example 3 was preferred over Example 4 due to the higher stiffness in the top to bottom direction (i.e. cross direction) of the container.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A biodegradable crush-resistant container comprising,
   a coated paperboard container having a Taber stiffness in the cross direction of the coated paperboard of at least 110 and having a moisture resistant inner polymeric coating in a thickness of 0.5 to 6.0 mils, and having an outer barrier polymeric coating which is resistant to contamination, and abrasion and which is water repellant,
   having therein moist towels having a lotion with a surface tension greater than about 27 dynes/cm,
   and a separable pouch or liner within said container between said container and said moist towels.

2. The biodegradable container according to claim 1, wherein the surface tension is greater than about 40 dynes/cm.

3. The biodegradable container according to claim 1, wherein the paperboard has a basis weight of at least 150 lbs/ream.

4. The biodegradable container according to claim 3, wherein the paperboard has a basis weight of at least 175 lbs/ream.

5. The biodegradable container according to claim 1, wherein the moisture resistant inner coating is applied in a thickness of 1.0 to 2.5 mils.

6. The biodegradable container according to claim 1, wherein the moisture resistant inner coating is low density polyethylene.

7. The biodegradable container according to claim 6, wherein the low density polyethylene is linear low density polyethylene.

8. The biodegradable container according to claim 7, wherein the outer barrier coating is linear low density polyethylene.

9. The biodegradable container according to claim 1, wherein the inner and outer coatings are polymers selected from the group consisting of polyethylene, low density polyethylene, linear low density polyethylene, polyolefins, Saran, PVC, polyester, polyethylene vinyl acetate and polyvinyl acetate.

10. The biodegradable container according to claim 1, wherein the outer barrier coating is applied in a thickness of 0.5 to 3.0 mils.

11. The biodegradable container according to claim 10, wherein the outer barrier coating is a applied in a thickness of 0.5 to 1.5 mils.

12. The biodegradable container according to claim 1, further comprising a membrane barrier located at the upper edge of the container overlying the contents of the container.

13. The biodegradable container according to claim 1, wherein the Taber stiffness in the cross direction of the coated paper board is at least 135.

14. The biodegradable container according to claim 1, wherein the ratio of Taber stiffness of MD/CD of the coated paperboard is less than 2.65.

15. The biodegradable container according to claim 14, wherein the ratio of Taber stiffness of MD/CD of the coated paperboard is less than 1.92.

16. The biodegradable container according to claim 1, wherein the bottom of the container is heat sealed.

17. The biodegradable container of claim 1, wherein the inner coating is a polymer selected from the group consisting of polyolefins, Saran polyester, polyethylene vinyl acetate, polyvinyl acetate and PVC.

18. The biodegradable container of claim 17, wherein the inner coating is a polyolefin selected from the group consisting of polyethylene, low density polyethylene and linear low density polyethylene and polyvinyl acetate.

19. The biodegradable container of claim 1, wherein the outer coating is a polymer selected from the group consisting of polyolefins, Saran polyester, polyethylene vinyl acetate, polyvinyl acetate and PVC.

20. The biodegradable container of claim 19, wherein the outer coating is a polyolefin selected from the group consisting of polyethylene, low density polyethylene and linear low density polyethylene and polyvinyl acetate.

21. A biodegradable, crush-resistant container comprising:
    a coated paperboard container having a hinged lid and having a Taber stiffness in the cross direction of the coated paperboard of at least 110, having a moisture resistant inner polymeric coating in a thickness of 0.5 to 6.0 mils, and having an outer barrier polymeric coating which is resistant to contamination and abrasion and which is water repellant, and
    having therein at least 80 moist towels having a lotion with a surface tension greater than about 27 dynes/cm,
    and a separable pouch or liner within said container between said container and said moist towels.

* * * * *

UNITED STATES PATENT AND TRADEMARK OFFICE
CERTIFICATE OF CORRECTION

PATENT NO. : 5,409,747                                    Page 1 of 2
DATED      : April 25, 1995
INVENTOR(S): Leonard Pearlstein et al.

It is certified that error appears in the above-indentified patent and that said Letters Patent is hereby corrected as shown below:

Front page, Inventors, line 1, delete ",1441 Waverly"

Front page, Inventors, line 2, delete "Ave." and "19035".

Claim 1, Col. 9, line 51, delete ",".

Claim 11, Col. 10, line 19, delete "a" (first occurrence).

Claim 13, Col. 10, line 27, change "paper board" to -- paperboard --.

Claim 17, Col. 10, line 38, after "Saran" insert -- , --.

Claim 18, Col. 10, lines 18 and 19, delete "and polyvinyl acetate".

UNITED STATES PATENT AND TRADEMARK OFFICE
CERTIFICATE OF CORRECTION

PATENT NO. : 5,409,747
DATED : April 25, 1995
INVENTOR(S) : Leonard Pearlstein et al.

It is certified that error appears in the above-indentified patent and that said Letters Patent is hereby corrected as shown below:

Claim 19, Col. 10, line 47, after "Saran" insert -- , --.

Claim 20, Col. 10, lines 52 and 53, delete "and polyvinyl acetate".

Claim 21, Col. 10, line 64, delete "dy".

Claim 21, Col. 10, line 65, before "nes" insert -- dy --.

Signed and Sealed this

Twenty-fifth Day of July, 1995

Attest:

BRUCE LEHMAN

Attesting Officer     Commissioner of Patents and Trademarks